United States Patent Office 3,126,365
Patented Mar. 24, 1964

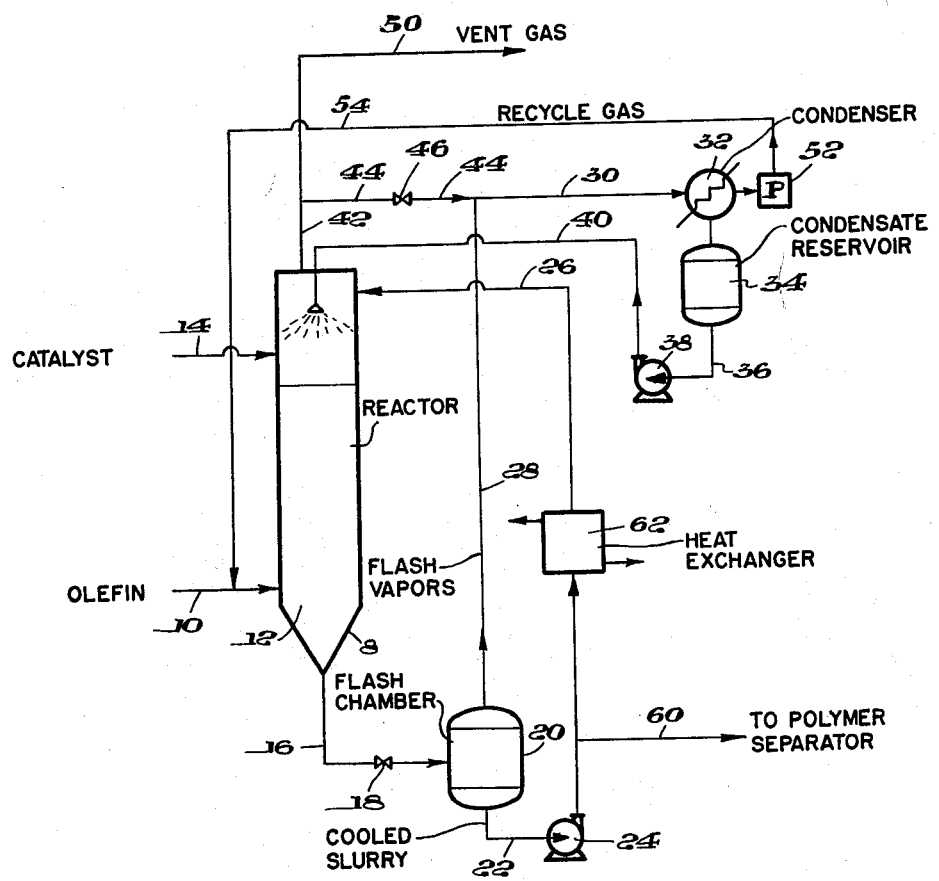

3,126,365
POLYMERIZATION
George W. Hooker, New Brighton, Pa., assignor to Koppers Company, Inc., a corporation of Delaware
Filed Aug. 11, 1958, Ser. No. 754,429
10 Claims. (Cl. 260—94.9)

This invention relates generally to the polymerization of olefinic compounds and more particularly to a process for polymerizing olefins at a predetermined reaction temperature.

Olefins, as is well known, will polymerize to relatively high molecular weight, solid, polymeric materials at the relatively low pressure of less than one hundred atmospheres and the relatively low temperatures of less than 100° C. in the presence of a catalyst complex which is an admixture of an organo-metallic compound and a compound of a metal of sub-groups IVB, VB, and VIB of the periodic table. When ethylene is the olefin to be polymerized, the polyethylene so produced may have a molecular weight ranging from twenty thousand to more than one million.

Particularly suitable for this admixture are organo-metallic compounds having the general formula RR′AlX, in which R and R′ are members selected from the group consisting of alkyl or aryl radicals and X is a member selected from the group consisting of hydrogen, alkyl, aryl radicals, halogen atoms, alkyloxy radicals, aryloxy radicals, secondary amino radicals, secondary acid amide radicals, mercapto radicals, thiophenyl radicals, and sulfonic acid radicals; typical of such compounds being the alkyl aluminum compounds such as aluminum triethyl, aluminum triisopropyl, aluminum triisobutyl, diethyl aluminum chloride, and diisobutyl aluminum hydride. The preferred compounds of metals of sub-groups IVB, VB, and VIB include those compounds of titanium, zirconium, uranium, thorium, and chromium, either the inorganic compounds such as the halides, oxyhalogenides, freshly precipitated oxides and hydroxides or the organic compounds such as the alcoholates, acetates, benzoates, acetyl acetanates.

The polymerization is generally carried out in an inert liquid, usually a hydrocarbon such as pentane, hexane, heptane, benzene, xylene, cyclohexane, and tetrahydronaphthalene. A particularly active catalyst mixture in an inert liquid may be obtained by the admixture in hexane of titanium tetrachloride and triethylaluminum. As the polymerization proceeds, the polymer particles tend to grow in size as they remain in the reactor and tend to settle at the bottom of the reactor as a thickened slurry.

The temperature at which the polymerization is carried out is one of the factors influencing the character of the product of the polymerization. The polymerization process, however, is exothermic in nature, the heat of polymerization of ethylene, for example, being in the neighborhood of 1605 B.t.u. per pound of polymer. Thus removal of this exothermic heat is required to carry out the polymerization at a selected temperature.

Removing this exothermic heat has presented difficulties because during the polymerization there are formed in the polymerization zone small amounts of a sticky polymer which adhere to the heat transfer surface. Attempts to remove the heat by surrounding the reactor with cooling walls, therefore, have not been satisfactory because this sticky polymer rapidly coats the walls of the reactor with a polyethylene film which provides a heat insulating medium, thereby making it necessary to clean the walls of the vessel after each batch of polymer is made. The circulation of the inert liquid polymerization medium through a heat exchanger external of the reaction zone has also been unsatisfactory as the surface of the heat exchanger rapidly becomes fouled with a coating of polymer or a wax or becomes plugged with the polymer.

Copending application Serial No. 513,576, now abandoned (but a counterpart has issued in Great Britain as Patent No. 826,562), solves the heat removal problem by conducting the polymerization in an inert liquid medium that boils at the desired temperature, thereby removing the exothermic heat of polymerization as heat of vaporization of the liquid. Pentane was particularly useful as the liquid medium because the optimum temperature for polymerizing ethylene under these conditions had been found to be below 65° C. Although the process of the aforesaid co-pending application worked well to maintain the temperature at a predetermined level, it had attendant disadvantages such as low olefin absorption, high catalyst consumption, and low product quality, probably because waxes and catalyst are precipitating with the polymer.

It has now been discovered in accordance with this invention that a constant temperature may be maintained in the reaction zone during the polymerization of an olefin to a solid polymer by feeding a portion of the inert liquid medium, advantageous as a slurry of liquid medium and solid polymer, to a flashing zone having a pressure lower than the pressure in the reaction zone, whereby some of the liquid evaporates from this portion in the flashing zone to cool the liquid, and thereafter returning the liquid so cooled to the reaction zone. For further heat removal, the vapors from the flashing zone may be cooled and returned to the reaction zone with or without the venting of the non-condensable gases. Also, if desired, a portion of the cooled slurry may be fed to a suitable separation station when the polymer is removed therefrom.

The inert organic liquid medium used in accordance with this invention may be hydrocarbons of the paraffin, cycloparaffin, and aromatic series, exemplary of which are those hydrocarbons discussed above, and advantageously those which when suddenly exposed to a temperature of between 50–95° C. at a pressure of between 1–2 atmospheres absolute, will vaporize to the extent of at least 3%. The inert liquid medium may, of course, be a single hydrocarbon such as hexane or a mixture of hydrocarbons such as a mixture of refined diesel oil and butane.

It is advantageous for operation in accordance with this invention that the lower limit of the temperature of the reaction zone be such that the temperature of the inert liquid medium leaving the reaction zone be above the temperature at which the inert liquid medium boils at the lower pressure in the flashing zone. However, the upper and lower limits for the temperature of the inert liquid medium in the reaction zone are set by practical limits. While the lower limit of the temperature of the liquid medium in the reaction zone is advantageously such that the temperature of the inert liquid medium leaving the reaction zone is above the temperature at which the inert liquid medium boils at the lower pressure in the reaction zone, when the inert liquid medium is of a type in which a substantial amount of ethylene will dissolve (the inert liquid medium is usually a hydrocarbon and ethylene solubility does not vary too much between hydrocarbons, however reactor pressure has an almost linear effect on solubility of ethylene), it is possible to operate with the temperature of the liquid medium in the reaction zone at or slightly lower than the boiling temperature of the inert liquid medium at the pressure in the flashing zone and flash the ethylene from the inert liquid medium at the lower pressure of the flashing zone and thus remove the heat from the residue. With regard to the upper limit, as the temperature of the hydrocarbon inert liquid medium increases, the tendency of the polymer to dissolve therein is increased. Thus the upper limit for the temperature of the reaction zone is also set for practical matter as that temperature at which the solubility of the polymer in the liquid inert medium becomes a factor, i.e., the temperature at which the slurry tends to take on the characteristics of a gummy mass due to the solubility of the polymer in the hydrocarbon. When the slurry becomes a gummy mass, it is difficult to wash the liquid medium and catalyst components from the polymer. For this reason the upper temperature limit is usually higher when the liquid medium is a paraffin than when it is a cycloparaffin or an aromatic hydrocarbon because the latter two classes of hydrocarbons are better solvents for the polymer.

The pressures maintained at the reacting zone and the flashing zone are also set by practical considerations. Except in cases of unusual catalytic activity, the polymerization in the reaction zone usually does not progress well at pressures below 0–5 pounds per square inch gauge; and, in general, the higher the pressure, the greater is the absorption efficiency and reactor capacity. However, if the catalytic activity be so high that essentially 100% absorption of olefin is achieved, it may be difficult to maintain high pressures on the inert liquid medium. The pressure in the flashing zone, of course, must be lower than the pressure in the reactor; but it is usually not desirable to operate at pressures in the flashing zone of less than atmospheric pressure as this becomes conducive to the possibility of leakage of air, such leakage kills the catalyst and may result in an explosive mixture with vapors of the inert medium.

A portion of the liquid leaving the reaction zone at a temperature above its boiling point at the pressure in the flashing zone vaporizes in the flashing zone and the residual portion is immediately cooled to the temperature-pressure equilibrium temperature in the flashing zone. The quantity of heat so removed from the liquid in the flashing zone is proportional to the rate of feed of slurry and to the temperature difference between the slurry leaving the reactor and the cooled slurry being returned to the reactor. The temperature difference, in turn, is a function of the difference between the pressure in the two zones; but the temperature in the flashing zone is substantially constant for any given liquid medium at a preset pressure. The pressure of the flashing zone may, for example, be controlled by a pressure regulator on the suction side of the compressor which recycles the vapor or on the flashing zone itself.

Additional heat may be removed by condensing the vapors leaving the flashing zone, sub-cooling the condensate to a temperature below the temperature in the reactor, and returning the sub-cooled condensate to the reactor. This condensate may advantageously be used as a heavy spray at the top of the reaction zone to remove the entrained catalyst and catalyst slurry from the gases leaving this zone. This additional heat removal, of course, is not achieved if this condensate be returned to the flashing zone as this merely suppresses the boiling in the zone.

In accordance with this invention, it is possible to use indirect heat exchange in conjunction with the external boiling system. A small amount of ethylene is probably present in the slurry from the reacting zone. However, as this slurry flashes in the flashing zone, the ethylene vaporizes from the slurry so as to leave little, if any, ethylene in the slurry to react thereafter. Since the principal problem involved heretofore has been a fouling of the heat exchange surface with a coating of polymer, the use of a heat exchanger becomes practical in accordance with the invention for the first time. Although it is not known precisely why less skin is formed in the external cooling system, it is suspected that the absence of ethylene due to this may be a factor.

The gas removed from the gas outlet of the reacting zone is usually recycled to the gas inlet to compensate for imperfect gas contact and for slow reaction rate. In systems where a low conversion of from 30–50% of ethylene to polyethylene is accomplished in a single pass, such recycling may give an overall conversion of 90% or better. In accordance with this invention, the gas recycle system may be used as an auxiliary source for removing heat from the reactor; the quantity of heat removed at a given temperature and pressure being proportional to the gas recycle ratio. Recycling the gas from the upper portion of the reaction zone to the lower portion of the reaction zone though has the disadvantage of increasing the impurity of the gas input to the reacting zone. Thus, the gas recycle ratio is a practical matter for as this ratio approaches infinity the impurity level approaches the impurity level of the gas leaving the reactor. The impurity level is important because impurities, for example, carbon monoxide, and propylene, affect the molecular weight of the product polymer while others adversely affect the catalyst. It is important, therefore, that the gas be vented periodically or at some predetermined rate so as to maintain a lower level of impurities. The latter is the more desirable, however, as this maintains a substantially constant impurity level. This venting is best taken directly from the line leaving the top of the reactor as this line will contain minimum olefin and maximum impurities.

Surprisingly, it has been found that, in addition to removing the exothermic heat so as to maintain the reaction at a predetermined temperature, the process of this invention also improves the overall operation of the system by unexpectedly increasing the catalytic activity and by eliminating lumps of polymer and skin formation. This process has further been found to yield a product having a decreased corrosion tendency and a reduction in undesirable color characteristics.

The reason for the foregoing unexpected results is not entirely known. It is thought that a gradual inactivation of the catalyst composition occurs in the processes as known heretofore because the polymer, as it is formed, gradually surrounds the active points of the catalyst, so that less of the catalyst is available for the further conversion of the olefin to polymer. It is known that the crude polymer of ethylene contains the polymerization catalyst therein and requires special processing to remove the catalyst from the polymer. It is believed that, in accordance with this invention, the sudden reduction in pressure causes flashing of the liquid within the polymer and catalysts particles or agglomerates, either ripping them apart or at least opening up channels whereby the coated particles of catalyst are again exposed so as to be available for further conversion of ethylene to polyethylene and whereby the polymer particles can be more readily washed free of catalyst. While this probably explains why lumps of polymer are virtually absent in the process of this invention, no reasonable explanation is available to account for the drastic reduction in skin formation on the walls of the reactor.

In the olefin polymerization processes as known heretofore, lumps and agglomerates tend to build up in the slurry and eventually to interfere with the washing and pumping operations. Thus it has been necessary in continuous processes to shut the equipment down periodically and completely clean the lines, pumps, and conduits.

A further surprising result achieved by this invention is that the slurry tends to be smooth and of consistent particle size. This is consistent with the proposition advanced above that the sudden reduction of pressure causes a ripping apart of the particles, thereby preventing this build up of particles and agglomerates and with the fact that the bulk density of the polymer produced in accordance with the process of this invention is from 8–10 whereas in the prior process as known heretofore the bulk density ran from 15–20. The fluffier polymer particles made in accordance with this invention would, of course, be lighter than the more dense particles made by the process known heretofore.

In accordance with this invention, an olefin, for example ethylene along with a catalyst admixture, for example an admixture of diethyl aluminum chloride and titanium tetrachloride in a mol ratio of 0.3:1–4:1, and an inert liquid medium, such as hexane, is fed into a reaction zone which is operated at some temperature above the atmospheric boiling point of the inert liquid medium, about 75–80° C. when hexane is used, and at a selected pressure, for example, 20 p.s.i.g., whereby the olefin polymerizes to solid polymers which tend to gravitate to the lower portion of the reaction zone as a slurry; feeding a portion of the slurry, for example 25 times the hexane is fed into a flashing zone having a controlled pressure of about 1–3 p.s.i.g., whereby the liquid medium flashes to an equilibrium temperature, about 72° C.–76° C. in the case of hexane, at the pressure in the latter zone and removes the heat from the slurry; and the so-cooled slurry is recirculated to the reaction zone. Since for a given rate of recirculation, the quantity of heat removed by flashing is directly proportional to the temperature difference between the slurry leaving the reactor and the slurry leaving the flash tank, the quantity of heat removed can be varied within limits (1) by regulating the temperature of the reaction zone and (2) by regulating the pressure of the flashing zone and (3) the quantity of slurry fed to the flashing zone. A temperature difference of about 8° C. has been found to be sufficient to remove all the heat of polymerization of ethylene, and a temperature difference of 2–5° C. is usually sufficient when a gas recycle step is used as the latter step removes a portion of the heat.

When the foregoing polymerization process is in operation, the slurry leaving the reactor may contain a small amount of ethylene, for example 5–10% of the fresh ethylene fed depending upon the reactor temperature and pressure. This small amount of ethylene is substantially removed with the boiling hexane in the flashing zone. Thus, the vapors from the flash tank are advantageously combined with the stream leaving the reaction zone, which stream also contains ethylene and some hexane vapors, and fed to a condenser where the hexane is condensed. The condensate may, if desired, be sub-cooled, for example, to about 35° C. (the extent of sub-cooling of the condensate being a practical matter depending upon conditions such as local water temperature) and thereafter returned to the reaction zone as a spray to scrub entrained polymer and catalyst from the gas leaving this zone. The condensate, when handled in this manner, may remove about 25% of the total heat load. The net effect of using the condensate to scrub the gases leaving the reactor, though, is to decrease the amount of heat removed by the gas recycle system and to increase the load on the external flashing system by an equivalent amount. To maintain impurities in the ethylene at the desired low level, small amounts of gas, for example 1–5%, may be vented from the reactor on a continuous flow control basis.

The single sheet of drawing illustrates schematically an embodiment of apparatus capable of carrying out the process of this invention.

In the drawing, an olefin is fed through a line 10 to a reactor 12, this reactor may advantageously be similar to the type described in co-pending application Serial No. 587,694, and now matured into U.S. Patent No. 2,918,460, wherein the agitation of the solution therein, as by entering the reactor through a plurality of nozzles, is sufficient so that further mechanical agitation is unnecessary. The admixture of catalyst for the polymerization and the auxiliary liquid flows from a suitable solution storage (not shown) through line 14 into a reactor 12 to maintain the reactor two thirds full of solution. The olefin polymerizes exothermally in reactor 12 to a solid polymer.

A slurry of solid polymer and liquid is fed through line 16 and reducing valve 18 into a flash chamber 20 of reduced pressure. As a result of the temperature of the slurry entering the chamber, a substantial amount of the auxiliary liquid and most of the unreacted olefin vaporizes, thereby cooling the residue liquid and solid.

A major portion of the cooled slurry residue from chamber 20 is recycled through line 22, pump 24, and line 26 to reactor 12. A continuous heat exchanger 62 may be provided in line 26 for further cooling the slurry if desired. A minor portion of the cooled slurry is removed from line 26 by way of line 60 for separation of polymer therefrom as by conventional centrifuge (not shown).

The olefin and a vaporized auxiliary liquid flows from flash chamber 20, is conducted through lines 28, 30 and condenser 32 to a reservoir 34 and from reservoir 34 through line 36, pump 38, and line 40 back to reactor 12. Also added to the line 30 by way of lines 42, 44 and valve 46 is the gas which has passed through the reactor 12. A portion of this gas in line 42 may be vented to the atmosphere by way of line 50. Any gas, mainly ethylene, which does not condense in condenser 32 is fed by way of pumps 52 and 54 back to line 10 to re-enter reactor 12.

The invention will be further illustrated by the following examples:

*Example 1*

To a reactor of the type described above and which is about 7' in diameter and 18' long and has a rounded head and a conical bottom, is fed substantially pure ethylene through dispersion nozzles at the rate of 2000 pounds per hour and a catalyst admixture (1 mol of titanium tetrachloride per 1.3 mols of diisobutyl aluminum chloride) at a concentration of 7 millimols of titanium tetrachloride per liter of hexane at the rate of 2000 gallons per hour. A pressure of 20 pounds per square inch is maintained in the reactor. The ethylene in polymerizing to solid polyethylene produces about 3,000,000 B.t.u. per hour. To remove this heat so as to maintain the temperature of the liquid in the reactor at about 80° centigrade, a slurry of the liquid and solid polyethylene is fed at the rate of 800 gallons per minute from the reactor through a reducing valve to a flashing vessel which is under pressure of about 3 pounds per square inch and where the slurry, due to the flash evaporation of the hexane, cools to a temperature of 76° C. The cooled slurry is fed at the rate of about 50,000 gallons per hour back to the reaction vessel and at the rate of 2,000 gallons per hour to a suitable separator such as a centrifuge. The vapors from the flashing vessel are fed to a condenser whose condensate is cooled to about 35° C. and returned to the reactor at the rate of about 12,000 pounds per hour. Non-condensable gases and ethylene from the condenser are fed at the rate of 1,600 pounds per hour under approximately 100 pounds per square inch pressure back to the reactor gas inlet to enter with the fresh ethylene. Gas is vented from the reacting zone to the atmosphere at the rate of about 50 pounds per hour. The absorption rate for the ethylene is 95–100%.

In the heat balance, approximately 150,000 of the 3,000,000 B.t.u. produced per hour are lost as heat radiation, and 550,000 are used to heat the cold feeds and about half of the remaining 2,300,000 B.t.u. per hour are removed in the recycle gas system and the other 50% are removed by the flashing of the solvent. However, by varying the gas recycle rate or varying the pumping rate or flash tank pressure, either the gas recycle system or the external cooling system is capable of removing up to 80% of the total net heat load.

In comparing the product polyethylene of this process with the product of the process of co-pending application Serial No. 513,576, it was found that the amount of ash in the polymer was reduced by 34%, the tendency toward corrosion was reduced by a factor of three. Additionally, the process of this invention produced 90% more polymer per pound of catalyst as compared with the process of the aforesaid co-pending application and increased the ethylene absorption 16%.

*Example II*

To the reactor of the type described in Example I and of the same length but having a 5' diameter, substantially pure ethylene gas (95% or better) at a controlled rate of 540 lbs. per hour was added through dispersing nozzles near the base of the reactor of Example I, which after equilibrium operation had been established, contained about 2400 gallons of polymer slurry in hexane and was maintained at a pressure of from 7–8 pounds per square inch gauge. At the same time, a catalyst slurry made by adding about 0.5 lb. diethylaluminum chloride and about 0.6 lb. titanium tetrachloride to 110 gallons of hexane was added at the top of the reactor in a continuous manner along with 430 gallons of hexane. The slurry at the rate of about 265 gallons per minute, was fed from the bottom of the reactor through a control valve to a flashing tank which had a capacity of about 2000 gallons and was maintained about half filled with slurry and under a pressure of 0–2 lbs. per square inch gauge. In the flash tank, about 5000 lbs. per hour of hexane and 25 lbs. per hour of ethylene flashed from the slurry. This vapor was passed through a condenser; the condensate thereafter cooled to about 32° C. and returned to the reactor and the non-condensed gas, mainly ethylene, leaving this condenser was compressed and added to the fresh ethylene being fed to the reactor. The slurry cooled to 70–71° C. by the flashing of the inert liquid medium was recycled from the flash tank to the top of the reactor to maintain the reactor temperature at between 76 and 78° C. Of the ethylene initially fed to the reactor 98% was converted to polyethylene having a melt index of 2.0–3.4. The external cooling thus removed about 90% of the net exothermic heat produced by the polymerization and external radiation and convection dissipated the remaining.

The foregoing has described a novel process for carrying out the exothermic polymerization of ethylene at a substantially constant temperature. There is presented, according to the invention, a practical and economically feasible process for balancing the heat produced in an inert liquid medium by the polymerization of an olefin against the heat removed from the medium, the medium being subjected to flashing to remove the heat therefrom and to enable further heat removal therefrom so as to maintain the polymerization zone at a constant temperature without the disadvantages presented by the heretofore known processes. This flash evaporation, in addition to cooling the medium which has not been evaporated, enables the gases to be recycled so as to subject them to more than one pass through the polymerization zone. The novel process of this invention affords the user thereof of a greater number of variables which can be used for balancing the heat produced by the polymerization against the heat removed so as to maintain the temperature constant, a few of such variables, for example, being the pressure difference between the flashing zone and the reaction zone, the rate of flow from the reaction zone to the flashing zone, the extent of sub-cooling of vapors from the flashing zone, the extent of recycle of non-condensable gases and the extent of external cooling of the residue from the flashing zone. While the foregoing examples have described a continuous process, it is clear to those skilled in the art that the external flashing step as described herein is applicable to batch and semi-continuous operations as well as continuous process. The product produced by the process of this invention has a better range of desirable characteristics than the product produced by the heretofore known processes.

I claim:

1. In a process wherein ethylene contacted with a catalyst produced by admixing .2 to 2 mols of an aluminum alkyl having the general formula $R_2AlX$ in which R is selected from the group consisting of lower alkyl radicals and X is selected from the group consisting of hydrogen, halide and lower alkyl radicals with a mol of titanium tetrachloride so that the ethylene polymerizes exothermally, the improvement for removing the exothermic heat so as to carry out said polymerization at a predetermined temperature and for increasing polymerization capacity, reducing catalyst requirements, maintaining vent lines free from plugging, increasing absorption efficiency and minimizing polymer build-up in the reactor system, said improvement producing a solid polymer of polyethylene having decreased corrosion tendencies, improved color characteristics and improved bulk density which improvement comprises the steps of contacting ethylene with said catalyst in a reaction zone under a pressure of between 1 to 10 atmospheres absolute in the presence of an inert liquid medium which is selected from the class consisting of the hydrocarbon of the paraffin, cycloparaffin, and aromatic series that, when suddenly subjected to a pressure of 1:2 atmospheres absolute at a temperature of 50–95° C. vaporize to the extent of at least 3%, whereby the ethylene polymerizes to solid particles of polymer and a slurry forms in said reaction zone, feeding a portion of the slurry from said reaction zone to a flashing zone of lower pressure whereby a portion of said liquid medium vaporizes to cool said slurry to an equilibrium temperature at said lower pressure, and returning the slurry so cooled to said reaction zone.

2. The process of claim 1 in which the predetermined temperature of the reaction zone is controlled by regulating the quantity of slurry fed to the flashing zone.

3. The process of claim 1 in which the predetermined temperature of the reaction zone is controlled by regulating the difference in pressure between the reaction zone and the flashing zone.

4. The process of claim 1 in which the inert liquid medium is hexane.

5. The process of claim 1 in which a portion of the unreacted ethylene inherently containing vapors of said liquid medium is withdrawn from said reaction zone, cooling said portion to condense the vapors of said liquid medium, and return both said condensed and non-condensed vapors to said reaction zone, thereby removing a portion of said exothermal heat.

6. The process of claim 1 in which the flash cooled slurry is further cooled by passing said slurry through a heat exchanger, and returning the further cooled slurry to said reaction zone, thereby removing a portion of the heat of reaction.

7. The process of claim 1 in which the vapors from the flashing zone are cooled and the portion of said vapors which condense is returned to the reaction zone.

8. The process of claim 7 in which the portion of the vapors from the flashing zone which do not condense is fed into the reaction zone with the ethylene entering the reaction zone.

9. The process of claim 8 in which a minor amount of the said portion which does not condense is vented to the atmosphere to minimize the build-up of impurities.

10. A process for the exothermic catalytic polymerization of an olefin in the presence of an inert liquid medium wherein the polymerization reaction zone is maintained at a predetermined temperature and whereby polymerization capacity is increased, catalyst requirements are reduced, vent lines are free from plugging, absorption efficiency is increased, and the polymer build-up in the reactor system is minimized, said process producing a solid polymer having decreased corrosion tendencies, improved color characteristics and improved bulk density, which process comprises the steps of conducting said polymerization in the presence of an auxiliary liquid chosen from the class consisting of paraffin, cycloparaffin, and aromatic hydrocarbons which, when suddenly exposed to a pressure of between 1–2 atmospheres absolute and at a temperature of between 50–95° C., will vaporize to the extent of at least 3% maintaining the temperature in said reaction zone within the range of 50–95° C., feeding a portion of the reacting medium to a zone of lower pressure whereby a portion of said medium and dissolved olefin vaporizes to cool the residue, and returning said residue to the reaction zone.

References Cited in the file of this patent

UNITED STATES PATENTS

| | | |
|---|---|---|
| 2,378,138 | Gaylor | June 12, 1945 |
| 2,745,823 | Hewitt | May 15, 1956 |
| 2,846,427 | Findlay | Aug. 5, 1958 |
| 2,885,389 | Schappert | May 5, 1959 |
| 2,908,671 | Hochgraf et al. | Oct. 13, 1959 |
| 2,930,787 | Stadler | Mar. 29, 1960 |
| 2,984,657 | Grundmann et al. | May 16, 1961 |